United States Patent
Garella et al.

(10) Patent No.: US 11,133,503 B2
(45) Date of Patent: Sep. 28, 2021

(54) PROCESS FOR MAKING CATHODE MATERIALS, AND REACTOR SUITABLE FOR CARRYING OUT SAID PROCESS

(71) Applicant: BASF SE, Ludwigshafen am Rhein (DE)

(72) Inventors: Dominik Garella, Lugwigshafen (DE); Axel Binder, Ludwigshafen (DE); Stefan Strege, Ludwigshafen (DE); Tillmann Liebsch, Ludwigshafen (DE)

(73) Assignee: BASF Corporation, Florham Park, NJ (US)

( * ) Notice: Subject to any disclaimer, the term of this patent is extended or adjusted under 35 U.S.C. 154(b) by 22 days.

(21) Appl. No.: 16/479,779

(22) PCT Filed: Jan. 12, 2018

(86) PCT No.: PCT/EP2018/050718
§ 371 (c)(1),
(2) Date: Jul. 22, 2019

(87) PCT Pub. No.: WO2018/134125
PCT Pub. Date: Jul. 26, 2018

(65) Prior Publication Data
US 2020/0075948 A1 Mar. 5, 2020

(30) Foreign Application Priority Data

Jan. 23, 2017 (EP) ..................................... 17152579

(51) Int. Cl.
*B01J 4/00* (2006.01)
*H01M 4/525* (2010.01)
(Continued)

(52) U.S. Cl.
CPC ............ *H01M 4/525* (2013.01); *B01J 4/001* (2013.01); *B01J 8/005* (2013.01); *B01J 8/1827* (2013.01);
(Continued)

(58) Field of Classification Search
CPC ............................... B01J 8/001; B01J 8/1818
See application file for complete search history.

(56) References Cited

U.S. PATENT DOCUMENTS 3,398,718 A 8/1968 Pilloton
8,993,051 B2 3/2015 Kelder et al.
(Continued)

FOREIGN PATENT DOCUMENTS

EP 3 304 635 4/2018
GB 873832 7/1961
(Continued)

OTHER PUBLICATIONS

U.S. Appl. No. 16/318,204, filed Jan. 16, 2019, US 2019-0233941 A1, Liebsch, T., et al.
(Continued)

*Primary Examiner* — Austin Murata
(74) *Attorney, Agent, or Firm* — Finnegan, Henderson, Farabow Garrett & Dunner LLP

(57) ABSTRACT

Process for making an at least partially coated particulate material, said process comprising the following steps: (a) providing a particulate material selected from lithiated nickel-cobalt aluminum oxides and layered lithium transition metal oxides, (a) treating said cathode active material with a metal alkoxide or metal amide or alkyl metal compound in a fluidized bed, (b) treating the material obtained in step (b) with moisture in a fluidized bed, and, optionally, repeating the sequence of steps (b) and (c), wherein the
(Continued)

Figure 1:
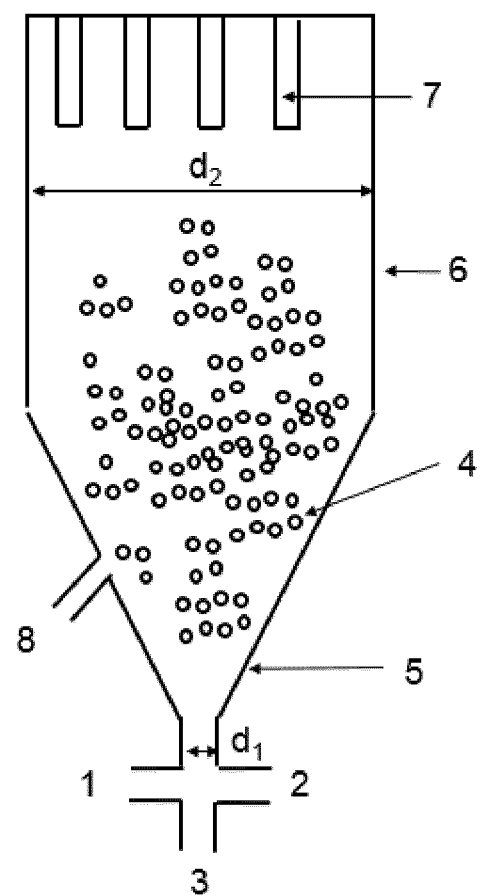
Figure 2:
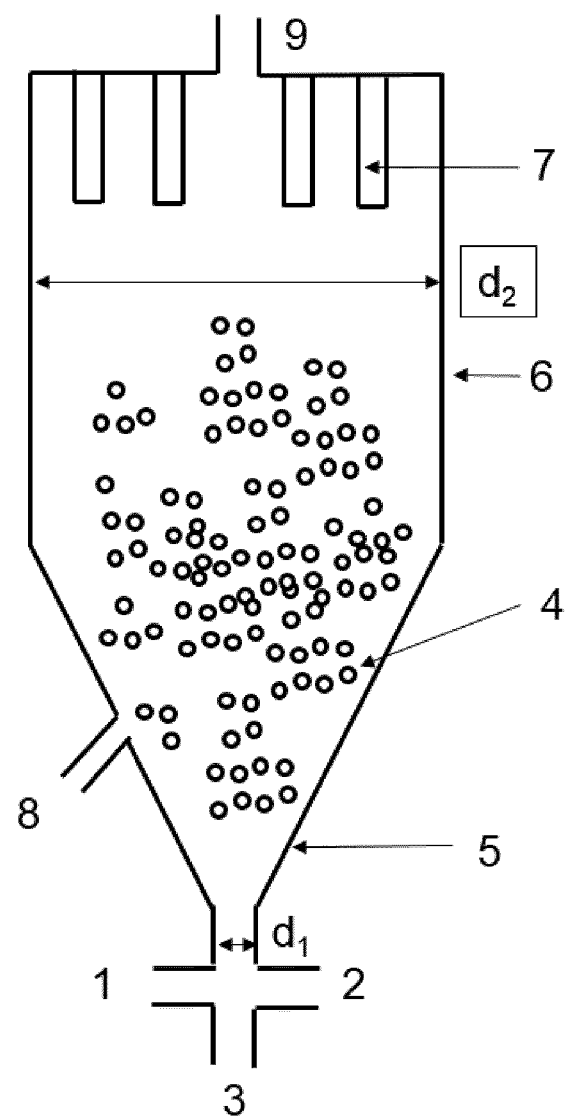

superficial gas velocity in the fluidized beds in steps (b) and (c) decreases with increasing reactor height.

4 Claims, 2 Drawing Sheets

(51) Int. Cl.
    *B01J 8/00*     (2006.01)
    *B01J 8/18*     (2006.01)
    *B01J 13/04*     (2006.01)
    *H01M 4/36*     (2006.01)
    *H01M 10/0525*     (2010.01)
    *H01M 4/1391*     (2010.01)
    *H01M 4/02*     (2006.01)

(52) U.S. Cl.
    CPC ........... *B01J 13/04* (2013.01); *H01M 4/1391* (2013.01); *H01M 4/366* (2013.01); *H01M 10/0525* (2013.01); *B01J 2208/00893* (2013.01); *H01M 2004/028* (2013.01)

(56) References Cited

U.S. PATENT DOCUMENTS

| | | | |
|---|---|---|---|
| 2008/0247939 A1* | 10/2008 | Lyuke | C01B 32/162 423/447.3 |
| 2009/0155590 A1 | 6/2009 | Kelder et al. | |
| 2009/0286157 A1 | 11/2009 | Chen et al. | |
| 2011/0117729 A1* | 5/2011 | Osborne | C23C 16/442 438/478 |
| 2011/0236575 A1 | 9/2011 | King et al. | |
| 2014/0302392 A1 | 10/2014 | Li et al. | |
| 2015/0162606 A1 | 6/2015 | Kelder et al. | |
| 2016/0226057 A1 | 8/2016 | Kelder et al. | |
| 2016/0233488 A1 | 8/2016 | Krkljus et al. | |
| 2017/0282140 A1 | 10/2017 | Kelder et al. | |

FOREIGN PATENT DOCUMENTS

| | | |
|---|---|---|
| JP | 2006-156032 A | 6/2006 |
| WO | WO 2010/100235 A1 | 9/2010 |
| WO | WO 2013/116717 A1 | 8/2013 |
| WO | WO 2013/140021 A1 | 9/2013 |
| WO | WO 2016/196688 A1 | 12/2016 |
| WO | WO 2018/019627 A1 | 2/2018 |

OTHER PUBLICATIONS

Extended European Search Report dated Apr. 6, 2017 in European Patent Application No. 17152579.3, 3 pages.
International Search Report dated Mar. 16, 2018 in PCT/EP2018/050718 filed on Jan. 12, 2018.

* cited by examiner

PROCESS FOR MAKING CATHODE MATERIALS, AND REACTOR SUITABLE FOR CARRYING OUT SAID PROCESS

The present invention relates to a process for making an at least partially particulate material, said process comprising the following steps:

(a) providing a particulate material selected from lithiated nickel-cobalt aluminum oxides and layered lithium transition metal oxides, (b) treating said cathode active material with a metal alkoxide or metal amide or alkyl metal compound in a fluidized bed, (c) treating the material obtained in step (b) with moisture in a fluidized bed, and, optionally, repeating the sequence of steps (b) and (c), wherein the superficial gas velocity in the fluidized beds in steps (b) and (c) decreases with increasing reactor height.

In addition, the present invention relates to a reactor suitable for the inventive process.

Lithium ion secondary batteries are modern devices for storing energy. Many application fields have been and are contemplated, from small devices such as mobile phones and laptop computers through car batteries and other batteries for e-mobility. Various components of the batteries have a decisive role with respect to the performance of the battery such as the electrolyte, the electrode materials, and the separator. Particular attention has been paid to the cathode materials. Several materials have been suggested, such as lithium iron phosphates, lithium cobalt oxides, and lithium nickel cobalt manganese oxides. Although extensive research has been performed the solutions found so far still leave room for improvement.

One problem of lithium ion batteries lies in undesired reactions on the surface of the cathode active materials. Such reactions may be a decomposition of the electrolyte or the solvent or both. It has thus been tried to protect the surface without hindering the lithium exchange during charging and discharging. Examples are attempts to coat the cathode active materials with, e.g., aluminium oxide or calcium oxide, see, e.g., U.S. Pat. No. 8,993,051.

Due to their particle size in combination with other material properties many cathode active materials tend to form agglomerates. It is therefore not easy to achieve a sufficiently uniform coating. In areas of particle contacts usually a reduced coating efficiency—if at all—is observed compared to areas of the particles that are exposed directly to the flow of reactants.

In WO 2013/140021, a reactor system is disclosed for coating certain materials with alumina generated in situ. Trimethyl aluminium, water and air are fed into a reactor directly through 3 different inlets.

It was therefore an objective of the present invention to provide a process by which particulate materials may be at least partially coated without an unduly long reaction time wherein such particulate materials have a tendency to form agglomerates. It was further an objective to provide a reactor for performing such a process.

Accordingly, the process as defined at the outset has been found, hereinafter also referred to as inventive process or as process according to the (present) invention. The inventive process is a process for making an at least partially coated particulate material.

The term "at least partially coated" as used in the context with the present invention refers to at least 80% of the particles of a batch of particulate material being coated, and to at least 75% of the surface of each particle being coated, for example 75 to 99% and preferably 80 to 90%.

The thickness of such coating may be very low, for example 0.1 to 5 nm. In other embodiments, the thickness may be in the range of from 6 to 15 nm. In further embodiments, the thickness of such coating is in the range of from 16 to 50 nm. The thickness in this context refers to an average thickness determined mathematically by calculating the amount of thickness per particle surface and assuming a 100% conversion.

Without wishing to be bound by any theory, it is believed that non-coated parts of particles do not react due to specific chemical properties of the particles, for example density of chemically reactive groups such as, but not limited to hydroxyl groups, oxide moieties with chemical constraint, or to adsorbed water.

In one embodiment of the present invention the particulate material has an average particle diameter (D50) in the range of from 3 to 20 μm, preferably from 5 to 16 μm. The average particle diameter can be determined, e.g., by light scattering or LASER diffraction. The particles are usually composed of agglomerates from primary particles, and the above particle diameter refers to the secondary particle diameter.

In one embodiment of the present invention, the particulate material has a BET surface in the range of from 0.1 to 1 m²/g. the BET surface may be determined by nitrogen adsorption after outgassing of the sample at 200° C. for 30 minutes or more and beyond this accordance with DIN ISO 9277:2010.

The inventive process comprises three steps (a), (b) and (c), in the context of the present invention also referred to as step (a), step (b) and step (c).

Step (a) includes providing a particulate material selected from lithiated nickel-cobalt aluminum oxides and lithiated layered transition metal oxides. Examples of lithiated layered transition metal oxides are $LiCoO_2$, $LiMnO_2$ and $LiNiO_2$. Examples are compounds of the general formula $Li_{1+x}(Ni_aCo_bMn_cM^4_d)_{1-x}O_2$, with $M^4$ being selected from Mg, Ca, Ba, Al, Ti, Zr, Zn, Mo, V and Fe, the further variables being defined as follows:

$zero \leq x \leq 0.2$ $0.1 \leq a \leq 0.8$, $zero \leq b \leq 0.5$, $0.1 \leq c \leq 0.6$, $zero \leq d \leq 0.1$, and $a+b+c+d=1$.

In a preferred embodiment, in compounds according to general formula (I)

$$Li_{(1+x)}[Ni_aCo_bMn_cM^4_d]_{(1-x)}O_2 \quad (I)$$

$M^4$ is selected from Ca, Mg, Al and Ba, and the further variables are defined as above.

Examples of lithiated nickel-cobalt aluminum oxides are compounds of the general formula $Li[Ni_hCo_iAl_j]O_{2+r}$. Typical values for r, h, i and j are:

h is in the range of from 0.8 to 0.90, i is in the range of from 0.15 to 0.19, j is in the range of from 0.01 to 0.05, and r is in the range of from zero to 0.4.

Particularly preferred are $Li_{(1+x)}[Ni_{0.33}Co_{0.33}Mn_{0.33}]_{(1-x)}O_2$, $Li_{(1+x)}[Ni_{0.5}Co_{0.2}Mn_{0.3}]_{(1-x)}O_2$, $Li_{(1+x)}[Ni_{0.6}Co_{0.2}Mn_{0.2}]_{(1-x)}O_2$, $Li_{(1+x)}[Ni_{0.7}Co_{0.2}Mn_{0.3}]_{(1-x)}O_2$, and $Li_{(1+x)}[Ni_{0.8}Co_{0.1}Mn_{0.1}]_{(1-x)}O_2$, each with x as defined above.

Said particulate material is preferably provided without any additive such as conductive carbon or binder but as free-flowing powder.

In one embodiment of the present invention particles of particulate material such as lithiated nickel-cobalt aluminum oxide or layered lithium transition metal oxide, respectively, are cohesive. That means that according to the Geldart grouping, the particulate material is difficult to fluidize and therefore qualifies for the Geldart C region. In the course of the present invention, though, mechanical stirring is not required.

Further examples of cohesive products are those with a flowability factor $Xff_c \leq 4$, preferably $1 < ff_c \leq 4$ ($ff_c = \sigma_1/\sigma_c$; $\sigma_1$—major principle stress, $\sigma_c$—unconfined yield strength) according to Jenike or those with a Hausner ratio $f_H \geq 1.3$, preferably $1.6 \geq f_H \geq 1.3$ ($f_H = \rho_{tap}/\rho_{bulk}$; $\rho_{tap}$—tapped density measured after 1250 strokes in jolting volumeter, $\rho_{bulk}$—bulk density according to DIN EN ISO 60).

In step (b) of the inventive process, the particulate material provided in step (a) is treated with a metal alkoxide or metal amide or alkyl metal compound in a fluidized bed. The fluidized bed will be described in more detail below.

In one embodiment of the inventive process, step (b) is performed at a temperature in the range of from 15 to 1000° C., preferably 15 to 500° C., more preferably 20 to 350° C., and even more preferably 50 to 150° C. It is preferred to select a temperature in step (b) at which metal alkoxide or metal amide or alkyl metal compound, as the case may be, is in the gas phase.

In a preferred embodiment of the present invention, alkyl metal compound or metal alkoxide or metal amide, respectively, is selected from $M^1(R^1)_2$, $M^2(R^1)_3$, $M^3(R^1)_{4-y}H_y$, $M^1(OR^2)_2$, $M^2(OR^2)_3$, $M^3(OR^2)_4$, $M^3[NR^2)_2]_4$, and methyl alumoxane, wherein $R^1$ are different or equal and selected from $C_1$-$C_8$-alkyl, straight-chain or branched, $R^2$ are different or equal and selected from $C_1$-$C_4$-alkyl, straight-chain or branched, $M^1$ is selected from Mg and Zn, $M^2$ is selected from Al and B, $M^3$ is selected from Si, Sn, Ti, Zr, and Hf, with Sn and Ti being preferred, the variable y is selected from zero to 4, especially zero and 1.

Metal alkoxides may be selected from $C_1$-$C_4$-alkoxides of alkali metals, preferably sodium and potassium, alkali earth metals, preferably magnesium and calcium, aluminum, silicon, and transition metals. Preferred transition metals are titanium and zirconium. Examples of alkoxides are methanolates, hereinafter also referred to as methoxides, ethanolates, hereinafter also referred to as ethoxides, propanolates, hereinafter also referred to as propoxides, and butanolates, hereinafter also referred to as butoxides. Specific examples of propoxides are n-propoxides and isopropoxides. Specific examples of butoxides are n-butoxides, isobutoxides, sec.-butoxides and tert.-butoxides. Combinations of alkoxides are feasible as well.

Examples of alkali metal alkoxides are $NaOCH_3$, $NaOC_2H_5$, $NaO$-iso-$C_3H_7$, $KOCH_3$, $KO$-iso-$C_3H_7$, and $K-O-C(CH_3)_3$.

Preferred examples of metal $C_1$-$C_4$-alkoxides are $Si(OCH_3)_4$, $Si(OC_2H_5)_4$, $Si(O$-n-$C_3H_7)_4$, $Si(O$-iso-$C_3H_7)_4$, $Si(O$-n-$C_4H_9)_4$, $Ti[OCH(CH_3)_2]_4$, $Ti(OC_4H_9)_4$, $Zn(OC_3H_7)_2$, $Zr(OC_4H_9)_4$, $Zr(OC_2H_5)_4$, $Al(OCH_3)_3$, $Al(OC_2H_5)_3$, $Al(O$-n-$C_3H_7)_3$, $Al(O$-iso-$C_3H_7)_3$, $Al(O$-sec.-$C_4H_9)_3$, and $Al(OC_2H_5)(O$-sec.-$C_4H_9)_2$.

Examples of metal alkyl compounds of an alkali metal selected from lithium, sodium and potassium, with alkyl lithium compounds such as methyl lithium, n-butyl lithium and n-hexyl lithium being particularly preferred. Examples of alkyl compounds of alkali earth metals are di-n-butyl magnesium and n-butyl-n-octyl magnesium ("BOMAG"). Examples of alkyl zinc compounds are dimethyl zinc and zinc diethyl.

Examples of aluminum alkyl compounds are trimethyl aluminum, triethyl aluminum, triisobutyl aluminum, and methyl alumoxane.

Metal amides are sometimes also referred to as metal imides. Examples of metal amides are $Na[N(CH_3)_2]$, $Li[N(CH_3)_2]$, and $Ti[N(CH_3)_2]_4$.

Particularly preferred compounds are selected from metal $C_1$-$C_4$-alkoxides and metal alkyl compounds, and even more preferred is trimethyl aluminum.

In one embodiment of the present invention, the amount of metal alkoxide or metal amide or alkyl metal compound is in the range of 0.1 to 1 g/kg particular material.

Preferably, the amount of metal alkoxide or metal amide or alkyl metal compound, respectively, is calculate to amount to 80 to 200% of a monomolecular layer on the particular material per cycle.

In a preferred embodiment of the present invention, the duration of step (b) is in the range of from 1 second to 2 hours, preferably 1 second up to 10 minutes.

In a third, optional step, in the context of the present invention also referred to as step (c), the material obtained in step (b) is treated with moisture in a fluidized bed.

In one embodiment of the present invention, step (c) is carried out at a temperature in the range of from 50 to 250° C.

Said moisture may be introduced, e.g., by fluidizing the material obtained in accordance with step (b) with moisture saturated inert gas, for example with moisture saturated nitrogen or moisture saturated noble gas, for example argon.

Although said step (c) may be replaced by a thermal treatment at a temperature in the arrange of from 150° C. to 600° C., preferably 250° C. to 450° C. it is preferred to carry out said step as indicated above.

On one embodiment of the present invention, step (c) has a duration in the range of from 10 seconds to 2 hours, preferable 1 second to 10 minutes.

In one embodiment, the sequence of steps (b) and (c) is carried out only once. In a preferred embodiment, the sequence of steps (b) and (c) is repeated, for example once or twice or up to 40 times. It is preferred to carry out the sequence of steps (b) and (c) two to six times.

In one embodiment of the present invention, the reactor in which the inventive process is carried out is flushed or purged with an inert gas between steps (b) and (c), for example with dry nitrogen or with dry argon. Suitable flushing—or purging—times are 1 second to 10 minutes. It is preferred that the amount of inert gas is sufficient to exchange the contents of the reactor of from one to 15 times. By such flushing or purging, the production of by-products such as separate particles of reaction product of metal alkoxide or metal amide or alkyl metal compound, respectively, with water can be avoided. In the case of the couple trimethyl aluminum and water, such by-products are methane and alumina or trimethyl aluminum that is not deposited on the particulate material, the latter being an undesired by-product.

The superficial gas velocity in the fluidized beds in steps (b) and (c) exhibits a gradient over the height of the reactor. In the region where the gas enters the reactor its superficial velocity is higher than in higher regions of the fluidized bed. For example, the superficial gas velocity may decrease by a factor in the range of from 1.5 to 1,000, preferably 10 to 100. The superficial gas velocity refers to the gas velocity with respect to the inner surface of the reactor, and it may also be referred to as "empty tube velocity" in case a reactor is tubular.

In a state-of-the-art fluidized bed in a cylindrical tubular reactor, the superficial gas velocity usually increases with increasing reactor height. In order to overcome the pressure drop caused by the fluidized particle bed the density of the fluidization gas decreases and thus the volume flow of the fluidization gas increases.

In one embodiment of the present invention, the incoming gas in the fluidized bed is introduced in the form of one jet stream. The jet stream is introduced at the bottom of the reaction vessel. The diameter of the jet stream is significantly smaller than the diameter of the reaction vessel in the cylindrical portion and may have a diameter in the range of from 10 to 100 mm.

In a preferred version of the present invention, the gas inlet velocity in a range which allows for the pneumatic conveying of said particulate material, e.g. 20 to 100 m/s. The outlet gas velocity, which corresponds to the gas velocity in the cylindrical part of the reactor, may be small by a factor of 10 to 1000, e.g. 2 cm/s to 2 m/s. The exact minimum gas inlet velocity at which pneumatic convection occurs does not only depend on the particle diameter but also on the viscosity and thus the temperature of the gas. It may be gathered from Reh's status diagrams.

In one embodiment of the present invention, the inlet pressure is higher but close to the desired reactor pressure. Pressure drops of gas inlet and the fluidized bed have to be compensated.

In one embodiment of the present invention the inventive process is performed at atmospheric pressure.

In one embodiment of the present invention, the one or more jet streams cause the fluidized bed to circulate. That means, in step (b) jet streams do not only facilitate the contact of metal alkoxide or metal amide or alkyl metal compound, respectively, with fluidized particulate material, but they also move particles around by lifting them from the lower part of the reactor to the higher part while the particles of particulate material that are located higher in the reactor move down triggered by gravitation forces.

In a preferred embodiment of the present invention, step (b) and—if applicable—step (c) are performed in a spouted bed.

In an even more preferred embodiment of the present invention, step (b) and—if applicable—step (c) are performed in a spouted bed with pulsed gas flow. A spouted bed with pulsed gas flow—sometimes hereinafter also referred to as intermittent spouted bed—is characterized in that the jet stream—or jet streams, if applicable—are performed pulse-wisely. The pulsation is useful with regard to the avoidance of cracks and channels (so-called 'rat-holes') in the fluidized bed through which the gas preferably flows and which therefore lead to the defluidization of other parts of the particulate bed. Pulsation allows for improvement of the fluidization, such as stirring or vibration energy.

In one embodiment of the present invention, the reactor for the fluidized bed has at least three joining inlets that join under the reaction zone and of which one serves for primary fluidization gas introduction, one serves for particle outlet and one for the gas that causes pulsation, if applicable, hereinafter also referred to as pulsation gas. Primary fluidization gas is inert gas, preferably without water. Such inlets join at the periphery of the reactor and under the reaction zone. The joining inlets serve as mixing faucet or static mixer.

In the course of the inventive process strong shear forces are introduced into the fluidized bed due to the shape of the reactor, the particles in the agglomerates are exchanged frequently, which allows for the accessibility of the full particle surface. By the inventive process, particulate materials may be coated in short time, and in particular cohesive particles may be coated very evenly.

Another aspect of the present invention refers to a tubular reactor, hereinafter also being referred to as inventive reactor or reactor according to the (present) invention, said inventive reactor comprising at least one conical part and, optionally, at least one part with constant diameter, wherein said tubular reactor has three joining inlets that join under the reaction zone and that may serve for introducing three different gases or aerosols and of which one serves for primary fluidization gas introduction, one serves for particle outlet and one for the gas that causes pulsation, if applicable. The mixing faucet is attached to the conical zone of the reactor under the reaction zone and may serve as a static mixer.

In one embodiment of the present invention, the outlet of particles is accomplished over the joint inlet as well. An outlet is shaped like an inlet.

In one embodiment of the present invention inventive tubular reactors have at least four inlets joining under the reaction zone and of which one serves as the reactive gas inlet, one serves as filter purge gas inlet, one serves for primary fluidizing gas introduction, one serves for particle outlet.

In preferred embodiments, the inventive reactor comprises at least five inlets that join under the reaction zone. In addition to the at least three inlets mentioned above one inlet may serve as reactive gas inlet and one for the filter purge gas inlet.

In one embodiment of the present invention, the opening angle of the conical portion of the inventive reactor is in the range of from 80° to 1° vs the vertical, preferably in the range of 30° to 15° vs the vertical.

In one embodiment of the present invention, the reactor inlet diameter is in the range of 1 mm to 1 m, preferably from 5 mm to 50 cm, and the cylindrical reactor diameter is chosen in a way that the aforementioned factors with regard to the ratio of the cross sectional areas of the cylindrical reactor diameter and the reactor inlet are given.

In one embodiment of the present invention, the wall material of the inventive reactor is selected from ceramic materials and stainless steel that may be coated with aluminum oxide. The coating material may have an average thickness in the range 0.1 to 10 nm, preferable 0.2 to 1 nm. Examples of suitable steels are stainless steels in the meaning of DIN EN 10088-1 to 10088-3. Ceramic materials may be selected from oxides, non-oxides, and composite materials. Examples of oxides suitable as ceramic material for the present invention are alumina and zirconia. Examples of non-oxides suitable as ceramic material for the present invention are borides, nitrides and carbides, especially SiC. Examples of composite materials are particulate reinforced ceramics, fiber reinforced ceramics and combinations of at least one oxide and at least one non-oxide. Preferred examples of composite materials are fiber-reinforced alumina and combinations of alumina and SiC.

In most embodiments, inventive reactors do not require elements for the gas distribution in fluidized beds that would cause a pressure drop and impact direction and/or velocity of the incoming gas, such as perforated or multi-orifice plates, tuyères, caps, nozzles, pipe grids and spargers. Inventive reactors therefore allow for a gravity driven flow of solids out of the reactor if the gas flow is turned off or reduced below a certain limit.

In one embodiment, one or more additional inlets for gas or particulate material may be located in the conical part of an inventive reactor. In other embodiments, no additional inlets are located in the conical part of an inventive reactor.

Inventive reactors are preferably connected to a device for removing dust from off-gas, for example an electrostatic dust precipitator, to a cyclone, or to a filtration unit.

Inventive reactors are well suited for carrying out the inventive process. Therefore, another aspect of the present invention is the use of an inventive reactor for performing the inventive process or even—more general—for chemically coating a particulate material, for example by atomic vapor deposition or by chemical vapor deposition.

A particular advantage of inventive reactors is that the superficial gas velocity can be adjusted easily so that only very little amounts to no non-coated particulate material can fall through the inlet at the bottom. Due to the shape of the reactor strong shear forces are introduced into fluidized beds, the particles in agglomerates are exchanged frequently, which allows for breaking up of agglomerates and for the accessibility of the full particle surface.

An exemplified embodiment of inventive reactors is shown in FIG. 1.

BRIEF DESCRIPTION OF FIGS. 1 AND 2

1: inlet primary fluidization gas
2: inlet pulsation gas
3: outlet coated particles
4: fluidized bed
5: conical part of the reactor, diameter $d_1$ at the mixing faucet
6: cylindrical part of the reactor, diameter $d_2$
7: optional: means for solid-gas separation, for example filter candle or filter cartridge
8: optional: inlet for introduction of non-coated particles
9: optional: introduction of solid particles Solid particular material may be introduced from the top or through inlet 8 or from the bottom of the reactor

The invention claimed is:

1. A tubular reactor, comprising at least one conical part and, optionally, at least one part with constant diameter, wherein the tubular reactor has at least four joining inlets that join under a reaction zone, of which one serves as a reactive gas inlet, one serves as a filter purge gas inlet, one serves for primary fluidizing gas introduction, and one serves as a particle outlet; wherein the at least four joining inlets join each other under the reaction zone; and wherein the tubular reactor is suited for carrying out a process for making an at least partially coated particulate material.

2. The tubular reactor of claim 1, wherein a wall material is chosen from ceramic materials and stainless steel and the wall material may or may not be coated with aluminum oxide.

3. The tubular reactor of claim 1, wherein any additional inlet are not gas inlets.

4. A process for chemically coating a particulate material, the process comprising employing the tubular reactor of claim 1.

* * * * *